(12) United States Patent
Blackwell

(10) Patent No.: US 9,994,349 B2
(45) Date of Patent: Jun. 12, 2018

(54) LABELING OF POLYMERIC CONTAINERS

(71) Applicant: Avery Dennison Corporation, Glendale, CA (US)

(72) Inventor: Christopher J. Blackwell, Garrettsville, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days. days.

(21) Appl. No.: 15/381,008

(22) Filed: Dec. 15, 2016

(65) Prior Publication Data

US 2017/0174380 A1 Jun. 22, 2017

Related U.S. Application Data

(60) Provisional application No. 62/268,079, filed on Dec. 16, 2015.

(51) Int. Cl.
*B65C 3/26* (2006.01)
*B32B 1/02* (2006.01)
(Continued)

(52) U.S. Cl.
CPC ............... *B65C 3/26* (2013.01); *B32B 1/02* (2013.01); *B32B 7/12* (2013.01); *B32B 27/08* (2013.01); *B32B 27/32* (2013.01); *B65D 23/14* (2013.01); *C09J 7/20* (2018.01); *G09F 3/02* (2013.01); *G09F 3/10* (2013.01); *B32B 2250/24* (2013.01); *B32B 2255/10* (2013.01); *B32B 2255/26* (2013.01); *B32B 2307/54* (2013.01);
(Continued)

(58) Field of Classification Search
CPC .... B65C 3/26; B32B 1/02; B32B 7/12; B32B 27/08; B32B 27/32; B32B 2250/24; B32B 2255/10; B32B 2255/26; B32B 2307/54; B32B 2307/7246; B32B 2307/7244; B32B 2439/60; G09F 3/10; G09F 3/02; G09F 2003/0273; G09F 2003/0257; G09F 2003/023; G09F 2003/0272; B65D 23/14; C09J 7/02; C09J 2203/334
See application file for complete search history.

(56) References Cited

U.S. PATENT DOCUMENTS 4,587,158 A 5/1986 Ewing
5,223,315 A 6/1993 Katsura et al.
(Continued)

FOREIGN PATENT DOCUMENTS

CN 1336279 2/2002
EP 0281701 9/1988
(Continued)

OTHER PUBLICATIONS

International Search Report and Written Opinion dated Mar. 14, 2017 issued in corresponding IA No. PCT/US2016/067048 filed Dec. 15, 2016.

*Primary Examiner* — Michael C Miggins
(74) *Attorney, Agent, or Firm* — Avery Dennison Corporation

(57) ABSTRACT

Label constructions and labeled containers are described which exhibit reduced label defects. The label constructions can be applied relatively soon after manufacture of the container and thereby avoid a requirement of storing containers for pre-designated dwell times. Also described are related methods of eliminating or at least reducing the occurrence of label defects by use of the label constructions and techniques of selecting the label constructions.

36 Claims, 2 Drawing Sheets

(51) Int. Cl.
  *B32B 7/12*     (2006.01)
  *B32B 27/08*    (2006.01)
  *B32B 27/32*    (2006.01)
  *G09F 3/10*     (2006.01)
  *G09F 3/02*     (2006.01)
  *B65D 23/14*    (2006.01)

(52) U.S. Cl.
  CPC ......... *B32B 2307/7244* (2013.01); *B32B 2307/7246* (2013.01); *B32B 2439/60* (2013.01); *C09J 2203/334* (2013.01); *G09F 2003/023* (2013.01); *G09F 2003/0257* (2013.01); *G09F 2003/0272* (2013.01); *G09F 2003/0273* (2013.01)

(56) References Cited

U.S. PATENT DOCUMENTS

| | | | |
|---|---|---|---|
| 6,838,042 | B1 | 1/2005 | Wieners et al. |
| 2003/0099823 | A1 | 5/2003 | Lin |
| 2008/0069990 | A1 | 3/2008 | Augestad et al. |

FOREIGN PATENT DOCUMENTS

| | | |
|---|---|---|
| EP | 2277695 | 1/2011 |
| JP | 2003-145647 | 5/2003 |
| WO | 2012/053821 | 4/2012 |
| WO | 2014/039796 | 3/2014 |

1

LABELING OF POLYMERIC CONTAINERS

The present application claims the benefit of U.S. Provisional Patent Application No. 62/268,079 filed on Dec. 16, 2015, which is incorporated herein by reference in its entirety.

FIELD

The present subject matter relates to methods for reducing label defects when labeling plastic containers such as bottles. The present subject matter also relates to labels for improved application to such containers. The present subject matter additionally relates to labeled containers.

BACKGROUND

Plastic bottles or similar containers are typically used to store liquids such as water, soft drinks, motor oil, milk, cooking oil, consumer healthcare products such as shampoo and soap, and inks. They are also used to store solids such as cat litter, pet food products, consumer food products such as coffee, and other foodstuffs. Plastic bottles are popular with manufacturers, distributors, and consumers due to their light weight and relatively low production costs as compared to glass bottles.

Plastic bottles are formed using a variety of techniques depending upon the choice of material and application. However, most manufacturing techniques involve heating the polymeric material above its melting temperature and then forming the material into a desired shape by molding, and in many applications by stretch blow molding.

Many bottle manufacturers or recyclers also apply labels after forming bottles. However, if labels are applied to a newly manufactured bottle, a variety of label defects often occur such as formation of bubbles, darts, wrinkles, or the like. As a result of this phenomenon, manufacturers typically store newly formed bottles for pre-designated periods of time before labelling. These bottle storage periods are referred to in the industry as "dwell times." Dwell times can be as long as 72 hours. The industry has several theories as to why bottle dwell storage reduces the occurrence of label defects. One theory is that the bottle requires time to attain dimensional stability as shrinkage may occur as the bottle cools to ambient temperature after molding. Regardless, storing bottles after their manufacture is costly and can require significant storage and inventory tracking systems particularly for high speed and continuous bottle manufacturing processes. This can represent a significant cost of storage and the potential for graphics to change, which will create waste.

Accordingly, a need exists for a strategy by which plastic containers could be labelled soon after their manufacture and bottle dwell storage could be avoided or at least the time period for such could be reduced.

SUMMARY

The difficulties and drawbacks associated with previously known practices are addressed in the present label constructions, labeled containers, and methods.

In one aspect, the present subject matter provides a label assembly comprising at least one film layer exhibiting a moisture vapor transmission rate (MVTR) of from 0.50 to 2.00 g/(m² per day) and an oxygen transmission rate (OTR) of from 800 to 1,700 cc/(m² per day). The label assembly also comprises a layer of an adhesive disposed along the at least one film layer. The film has a MD modulus of from 50,000 to 300,000 psi.

In another aspect, the present subject matter provides a labeled polymeric container comprising a polymeric container, and a label assembly. The label assembly includes (i) at least one film layer exhibiting a moisture vapor transmission rate (MVTR) of from 0.50 to 2.00 g/(m² per day) and an oxygen transmission rate (OTR) of from 800 to 1,700 cc/(m² per day), and (ii) a layer of an adhesive disposed between the at least one film layer and the container. The film has a MD modulus of from 50,000 to 300,000 psi.

In yet another aspect, the present subject matter provides a method of labeling polymeric containers. The method comprises selecting a particular label assembly that includes at least one film layer exhibiting a moisture vapor transmission rate (MVTR) of from 0.50 to 2.00 g/(m² per day) and an oxygen transmission rate (OTR) of from 800 to 1,700 cc/(m² per day), and a layer of an adhesive disposed along the at least one film layer, in which the film has a MD modulus of from 50,000 to 300,000 psi. The method also comprises applying the label assembly to the polymeric container.

In another aspect, the combination of film and adhesive yields a result in which the rate at which the bottle is emitting gases (referred to outgassing) does not cause label defects due to the adhesive having proper co-adhesive strength and rheological properties to allow the gas to escape and the adhesive to flow around bubbles of gas in such a way that no visual channel or other evidence the emitted gas has passed through the adhesive is visually evident. Additionally, the film has an MVTR and OTR which is sufficient to allow the emitted gas to permeate the film rather than being trapped at the interface between the film and adhesive layer, further avoiding defects. In one instance, the modulus of the film is selected to conform to the container while not incurring defects from the movement of the labeled article, adhesive, and/or film during the shrinkage and outgassing process of the bottle.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
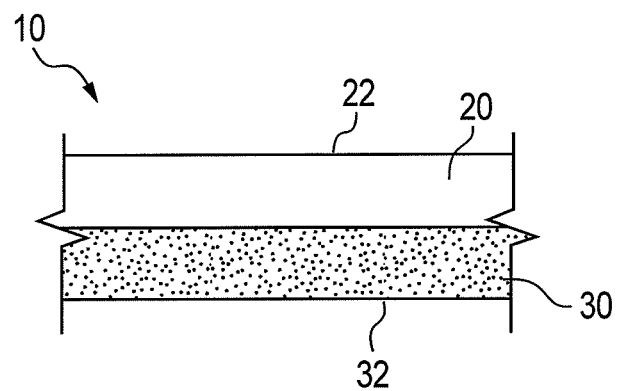
FIG. 1 is a schematic cross sectional view of a label construction in accordance with an embodiment of the present subject matter.

The present subject matter provides particular label constructions that can be applied to newly manufactured polymeric containers such as bottles, and which in many applications do not require dwell storage. In the event that dwell storage is still used for containers labeled in accordance with the present subject matter, the dwell storage time period is significantly reduced as compared to a comparable conventional label. In accordance with the present subject matter, the label constructions can be applied to a plastic bottle immediately or substantially so, after manufacture of the bottle. The present subject matter also provides labeled substrates and labeled containers such as bottles. And, the present subject matter provides various methods associated with labeling containers, and methods for reducing the occurrence of label defects. These aspects are all described in greater detail herein.

The terms "bottle" and "containers" are used interchangeably herein unless noted otherwise. These terms encompass nearly any thin wall polymeric container for storing liquids. As previously noted, an example of such containers is plastic beverage bottles. In many embodiments, the bottles are configured for holding liquids. A nonlimiting example of bottles configured for holding liquid includes beverage bottles having a body that extends between a flat bottom and an upwardly extending neck and opening. Typically such beverage bottles have cylindrically shaped bodies. It will be appreciated that the present subject matter can be utilized in conjunction with a wide array of container configurations and applications, and in no way is limited to beverage bottles.

Before turning attention to the label constructions, labeled polymeric containers, and related methods of the present subject matter, it is instructive to consider suspected causes of label defects associated with conventional bottling practices if dwell storage is not used.

Causes of Certain Label Defects

Without wishing to be bound to any particular theory, it is believed that many label defects such as bubbles, darts, wrinkles, and the like, result from outgassing of the polymeric material. Many bottles are formed from high density polyethylene (HDPE) which typically exhibits a high degree of outgassing. Gas chromatograph analysis performed by the assignee of the present application, of commercially available HDPE pellets indicate the presence of several alkane gases in the pellets such as decane, pentadecane, and 9-hexylheptadecane. After heating and forming of a polymeric container, and particularly one formed from HDPE, alkane gases are emitted along the newly formed container surfaces. Bottles can also be comprised of PET, PP, Vinyl, PLA, and many other plastics as well.

A particular type of labeling defect stems from bubbles that emanate from the bottle side and migrate through the label adhesive toward the label facestock. The bubbles, typically comprising various alkane gases, become trapped under the label facestock and thus cause visible defects in the adherence of the label to the wall of the bottle. These defects typically appear in the label as bubbles, darts, wrinkles, and the like. The present subject matter is directed to preventing or at least reducing the occurrence of these defects.

It will be appreciated however that the present subject matter is not limited to these types of label defects. Instead, the present subject matter is believed to have wide applicability to eliminate or reduce the potential for other labeling defects or issues.

Label Constructions

In one aspect of the present subject matter, label constructions or assemblies are provided that exhibit a particular combination of characteristics. In certain embodiments, the label facestock or film layer(s) is selected so as to exhibit a relatively high oxygen transmission rate and/or a relatively low moisture vapor transmission rate. In certain embodiments, the adhesive is selected so as to allow any gases or air to permeate through the layer of adhesive. Thus, the adhesive exhibits a relatively high co-adhesive property, i.e., an affinity to itself, so that the adhesive can flow back together and close any tunnels or paths that resulted from passage of gas. In certain embodiments, the label constructions of the present subject matter exhibit all of these characteristics. These aspects are all discussed in greater detail herein.

In many embodiments, the label facestock or film layer exhibits a particular oxygen transmission rate (OTR) and/or a particular moisture vapor transmission rate (MVTR). In certain embodiments, the label facestock exhibits a MVTR of from about 0.50 to 2.00 and more particularly from 0.70 to 1.79 g/(m² per day). The MVTR of the films is measured in accordance with ASTM Method F 1249. In certain embodiments, the label facestock exhibits an OTR of from about 800 to about 1,700, and more particularly from 913 to 1,520 cc/(m² per day). The oxygen transmission rate of the films is determined in accordance with ASTM Method F 1927. And, in several embodiments of the present subject matter, the label facestock exhibits a combination of these properties. It will be appreciated that the present subject matter includes the use of facestocks exhibiting OTR and/or MVTR values less than or greater than these values. As explained in greater detail herein, the label facestock may include multiple layers such as two layers, three layers, or more. In such embodiments, the collection, i.e., all, of the layers should collectively exhibit these properties of relatively high OTR and/or relatively low MVTR.

In many embodiments, the label facestock is formed from polypropylene (PP), polyethylene (PE), polyethylene terephthalate (PET), polylactic acid (PLA), polystyrene (PS), polyvinyl chloride (PVC), and combinations of these and potentially with other materials. Oriented and non-oriented films may be used. For example, for a polypropylene facestock, the PP film is typically biaxially oriented polypropylene (BOPP). In certain embodiments, the label facestock is formed from commercially available films such as for example FASCLEAR 350 and Crystal Fasclear available from Avery Dennison; RAFLEX Plus available from UPM Raflatac; Global Coex (GCX) NTC Clear from Avery Dennison; and PE 85 NTC clear from Avery Dennison. These commercially available films are blends of polypropylene and polyethylene.

The label facestock typically has a thickness of from 1.0 mil to 10 mils, and in certain embodiments a thickness of 1.4 mils to 4 mils. The thickness is typically selected in view of the label material, end use requirements, and is not so thick as to impede transmission of oxygen and/or moisture.

In certain embodiments, the adhesive, as previously noted, is selected so as to allow any gases or air to permeate through the layer of adhesive and also exhibit a relatively high co-adhesive property, i.e., an affinity to itself, so that the adhesive can flow back together and close any tunnels or paths that resulted from gas passage.

In certain embodiments, the adhesive is an acrylic emulsion adhesive. In particular embodiments, the adhesive is a permanent acrylic emulsion adhesive. Nonlimiting examples of commercially available adhesives include S692N, S730, S1000, S3000, and S490 all available from Avery Dennison. Another example of a potentially suitable commercially available adhesive is RP75 from UPM Raflatac. The adhesive is typically a pressure sensitive adhesive.

In particular versions of the present subject matter, the film selected for use in the label constructions exhibits a MD modulus of from about 50,000 to about 300,000 and particularly from about 80,000 to about 225,000 psi. MD Modulus is measured in accordance with ASTM D-882. However, it will be appreciated that the present subject matter includes the use of adhesives exhibiting moduli values less than or greater than these values.

Adhesive layer thickness or coatweight for the label constructions of the present subject matter depend upon the particular application. However, for many embodiments, a coatweight of from about 10 to about 40, and more particularly from 18 to 27 $g/m^2$ (also referred to as gsm) can be used. The adhesive can be in the form of a layer of uniform thickness. In certain embodiments, the adhesive could be pattern coated. Adhesive can be applied to the facestock or other layer(s) by known techniques such as curtain coating. Release liners can also be used in the label assemblies such as glassine or PET liners.

Additionally, the adhesive may play a role in the defects. While not wishing to be bound by any one theory, it is believed that the emitted gas from the labeled container, when trapped between the labeled container and the label, will form pockets of voids in the adhesive which can subsequently move, thereby causing the visual defects perceived as wrinkles and bubbles. One theory is than an adhesive that flows will allow the gas bubble to pass through and not remain trapped between the labeled bottle and the label, provided the label film has sufficient MVTR and OTR to permit the gas to migrate through the film. Rheology is the study of adhesive flow, and a particularly useful property is tan delta which for purposes of this application is defined as the ratio of viscous modulus (G″) to elastic modulus (G′) and a useful quantifier of the presence and extent of elasticity or flowability in a fluid. In particular versions of the subject matter, the adhesive selected has a tan delta value of 0.3-1.9 at 170-190 C. Additionally or alternatively, the adhesive has a tan delta value from 0.5-3.2 at 140-170 C. The higher values of tan delta correspond to an adhesive that flows and helps alleviate the aforementioned defect in combination with the right selection of film as previously outlined.

Polymeric Container

The polymeric container or bottle to receive the label constructions of the present subject matter can be formed from a wide range of polymeric materials such as high density polyethylene (HDPE), polypropylene (PP), polystyrene (PS), ethylene vinyl alcohol (EVOH), polyethylene terephthalate (PET), polylactic acid (PLA), polyvinyl chloride (PVC), and nearly any other olefin or plastic blend or coextrusions thereof. In particular applications, HDPE, PP, PET, and blends or multilayer constructions thereof with EVOH can be used. Further, PLA will likely grow in popularity for use in bottles or containers if sustainability trends continue.

EXAMPLES

A series of investigations were performed to evaluate various label constructions applied to newly molded HDPE bottles, and the extent of label defects occurring thereafter.

Label constructions A-K were prepared and applied to newly molded bottles. The bottles were 6 inches in height and 2.5 inches in diameter and formed from Dow HDPE DMDA 6400NT 7 having a melt index of 0.8. The HDPE pellets were free of additional additives such as antioxidants, antistatic agents, slip agents, and anti block agents. The bottles were flame treated prior to evaluation. The various label constructions were applied to the bottles after 5 minutes from the bottles exiting a mold. The bottle temperature at the time of label application was within a range of 83 to 98° F.

After application of the labels to the bottles, counts of defective labels were made at 1 hour, 4 hours, and 24 hours. Defects were in the form of visible bubbles under the facestock, or the occurrence of any darts or wrinkles in the label facestock.

Table 1 summarizes the labels, their application parameters, and defects.

TABLE 1

Summary of Labeling Investigations

| Label Construction | Facestock | MD Modulus of Film (psi) | Adhesive | Bottle Temp out of Mold, F. | Flame Treat? | Bottle Dwell Time | Bottles Labeled | Defective Labels 1 Hour | Total Defective Labels 4 Hour | Total Defective Labels 24 hour | Zero Defect Labels 24 hour |
|---|---|---|---|---|---|---|---|---|---|---|---|
| A | 2 mil Clear BOPP | 225,000 | S692N | 90-98 | Yes | 5 min. | 10 | 9 | 9 | 9 | 10% |
| B | Fasclear 350 | 130,000 | S692N | 85-97 | Yes | 5 min. | 10 | 10 | 10 | 9 | 10% |
| C | Crystal Fasclear | 155,000 | S692N | 88-95 | Yes | 5 min. | 10 | 6 | 8 | 5 | 50% |
| D | 2.0 mil Clear BOPP | 225,000 | S730 | 89-97 | Yes | 5 min. | 10 | 9 | 10 | 9 | 10% |
| E | Fasclear 350 | 130,000 | S1000 | 90-97 | Yes | 5 min. | 10 | 8 | 9 | 2 | 80% |
| F | Crystal Fasclear | 115,000 | S3000 | 87-91 | Yes | 5 min. | 10 | 10 | 10 | 9 | 10% |
| G | 2.0 mil Clear BOPP | 225,000 | S3000 | 87-92 | Yes | 5 min. | 10 | 10 | 10 | 10 | 0% |
| H | Raflex Plus | 150,000 | RP75 | 83-91 | Yes | 5 min. | 10 | 9 | 10 | 8 | 20% |
| I | 2.0 mil Clear BOPP | 225,000 | S490 | 87-93 | Yes | 5 min. | 10 | 9 | 10 | 9 | 10% |
| J | GCX NTC* Clear | 180,000 | S692 N | 86-90 | Yes | 5 min. | 10 | 6 | 7 | 6 | 40% |
| K | PE 85 NTC Clear | 83,000 | S692N | 88-91 | Yes | 5 min. | 10 | 2 | 4 | 1 | 90% |

After obtaining the results and tabulating the number of labels having defects, several techniques were used to arrive at root cause and conclusions. Due to multiple properties and films employed, a best subsets analysis was used to extract conclusions as to what factors led to a successful label. Various films were used with a fixed adhesive, S692N, at a fixed coatweight. With this analysis of common factors (modulus, stiffness, tear, MVTR, and OTR) a predictive equation was found that had an R-squared value of 93.3%. Additionally, with further analysis, standard statistical diagnostic tools such as normal probability plot, histogram, fits, and order did not detect any issues that would indicate the data could be skewed or interpretations would be suspect. With the above analysis, the following fresh bottle label predictive equation of film properties was derived. This equation is periodically referred to herein as equation (I).

Percentage Pass=1.33−0.000006(*MD* Modulus)−0.785(MVTR)+0.000686(OTR)

Equation (I) provides a prediction as to the percentage pass for label constructions based upon (i) the MD modulus of the adhesive, (ii) the MVTR of the facestock, and (iii) the OTR of the facestock. Using equation (I), for a label construction having characteristics (i)-(iii) which lead to a 100% pass, means that no label defects are predicted. Equation (I) was obtained as a linear regression analysis in MINITAB Software available from Minitab, Inc.

While one of ordinary skill in the art would have expected that a film having a relatively lower modulus would demonstrate fewer defective labels as compared to the number of defective labels made from a film having a relatively higher modulus. It is generally understood that a film with a lower modulus is more conformable than a film with a higher modulus, and accordingly, the lower modulus (more conformable) film would be expected to conform to the shape of the labeled bottle and accordingly demonstrate fewer defects. As shown in example K, the lowest modulus (83,000 psi) film PE 85 is listed. However, in example F (Crystal Fasclear at 115,000 psi modulus) and example B (Fasclear 350 at 130,000 psi modulus), the results don't align with the expectation that a lower modulus film would demonstrate fewer defective labels as compared to a higher modulus film. In fact, example E (Fasclear 350 film and a different adhesive, S1000), the results are similar to those exhibited by example K. This comparison demonstrates that the modulus is not the sole determining factor for label defects in the instant tests, and instead that at least the combination of the adhesive properties and the film properties influence defective labels. This data aligns with the formula from above, and thus contravenes what would be expected by one of ordinary skill in the art, that the lower the modulus of the film, the better fresh bottle label performance. Such data is also consistent with the new understanding that selecting a film which allows gas to escape at rate that is the same or higher than the rate at which the bottle or other substrate emits gas at the bottle-adhesive interface results in relative fewer defects than a configuration where the gas emission rate of the bottle is greater than the gas emission rate of the film.

Accordingly, the problem that has traditionally been identified in relation to labeling of fresh bottles, that the standard combination of film and adhesive must be more conformable to the bottle to eliminate label defects, has not proven to be the source of label defects. Here, the problem has actually been entrapment of gas emitted by the bottle between the label and the bottle, and the solution to this problem, rather than providing a more conformable film, has been to provide a film having an MVTR which is greater than the rate at which the bottle is emitting gas in combination with an adhesive demonstrating rheological properties which permit gas to flow through the adhesive and transfer through the film, while the adhesive still flows back upon the path of the gas so as not to provide any observable trail of entrained gas.

An example of applying equation (I) is as follows using a label construction of a 2 mil clear biaxially oriented polypropylene (BOPP) facestock within a layer of S692N adhesive. The modulus of that film is 225,000 psi, the MVTR of the facestock is 0.69 g/($m^2$ per day), and the OTR of the facestock is 994 cc/($m^2$ per day). Using these values in equation (I) results in a predicted pass rate of 0.12 or 12%. This is consistent with the data obtained in Table 1 (see Label Construction A). Although a predicted pass rate of 12% is likely unacceptable to industry, it is believed that for certain applications a BOPP facestock could be used if other aspects were modified. For example, selecting a thinner BOPP facestock and using a film exhibiting a different MD modulus could lead to a higher predicted label pass rate.

Methods

The present subject matter also provides methods of labeling plastic containers in which the resulting labeled containers exhibit a relatively low label defect rate. The methods generally comprise selecting a suitable label construction, and applying the label construction to a container and typically to a newly produced plastic container. The label includes at least one film layer and a layer of an adhesive. The label is applied to a plastic container by contacting and/or adhering the adhesive layer to the container. Typically, the adhesive is contacted with an outer surface of the container. The methods may also include other processing operations or steps typically employed in the plastic container and/or labeling industries.

The label constructions that can be used are selected such that the label facestock exhibits at least one of the previously noted OTR and MVTR values. In certain embodiments, the label constructions are selected such that the label facestock exhibits both of the previously noted OTR and MVTR values. And, in particular embodiments, the label constructions are selected such that the adhesive used in the label constructions exhibits the previously noted modulus values. And, in still other embodiments, the label constructions are selected such that the label facestock exhibits one or both of the noted OTR and MVTR values in combination with the adhesive exhibiting the noted modulus values.

Selection of the label construction can be performed by using equation (I) as a guide to selecting facestock and adhesive materials. Equation (I) provides an estimate of the percentage of applied labels that are free of labeling defects after label application, based upon the noted properties of the facestock and the adhesive.

The methods also involve applying selected label constructions to a plastic container. As described herein, in accordance with the present subject matter, selected label constructions can be applied to plastic containers that are newly manufactured. In many embodiments of the present subject matter, the labels can be applied within 15 minutes, more particularly within 10 minutes, and more particularly within 5 minutes of a container's manufacture, i.e., molding. Typically, for HDPE bottles which are typically molded at a temperature of about 265° F., the label construction can be applied to the newly manufactured bottle within 15 minutes after molding and when the temperature of the bottle is from about 75° F. to 125° F. Application of the selected label construction to the container or bottle of interest can be performed by any suitable labeling technique. A wide variety of conventional labeling techniques and equipment are commercially available. However, it will be appreciated that the present subject matter is not limited to any of these techniques or practices. Instead, the present subject matter will have a wide array of applications and variant aspects.

The present subject matter also provides methods of reducing the occurrence of label defects. These methods involve selecting particular combinations of properties for facestocks and/or adhesive used in the label assembly by use of equation (I) noted herein. That is, if a particular label pass rate percentage is desired, such as 95%, the facestock is selected and/or the adhesive is selected, or both of these components are selected such that equation (I) equals 0.95 or greater, i.e., 0.98. Alternatively, for a known label construction having a known facestock OTR, a known facestock MVTR, and a known adhesive MD modulus, those values can be used in equation (I) to arrive at a predicted label pass rate. Then, using equation (I), consideration can be made as to changes in the facestock OTR, facestock MVTR, and/or adhesive MD modulus that result in an increase in the predicted label pass rate.

The present subject matter also provides methods of eliminating a need for bottle dwell storage or at least reducing the time periods associated with such storage. These methods involve selecting particular combinations of properties for facestocks and/or adhesive used in the label assembly by use of equation (I) noted herein. Thus, for a known label construction having a known facestock OTR, a known facestock MVTR, and a known adhesive MD modulus; equation (I) can be used to evaluate the particular OTR, MVTR, and/or modulus values and whether those values should be increased or decreased in order to increase the predicted label pass rate, and in certain applications maximize the label pass rate.

Representative Embodiments

FIG. 1 is a schematic cross sectional view of an embodiment of a label construction in accordance with the present subject matter. The label construction 10 comprises one or more label facestock (or face) layers, collectively designated as 20, and a layer or region of an adhesive shown as 30. The outer surface of the facestock is shown as 22 and depending upon end use, may receive one or more material layers or coatings thereon. The adhesive layer 30 defines an adhesive face 32 that contacts a receiving surface or substrate such as a polymeric container.

Figure 2:
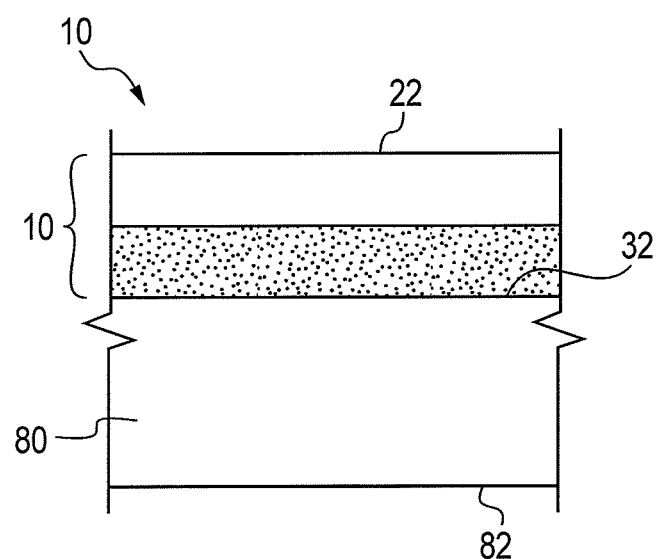
FIG. 2 is a schematic cross sectional view of the label construction of FIG. 1 applied to a polymeric substrate.

FIG. 2 is a schematic cross sectional view of the label construction of FIG. 1 adhered to a polymeric substrate 80. FIG. 2 shows a system 100 of a labeled substrate. The substrate 80 may be in the form of a wall of a container such as a plastic bottle sidewall. The sidewall defines an inner face 82, which defines an interior region of the bottle.

Figure 3:
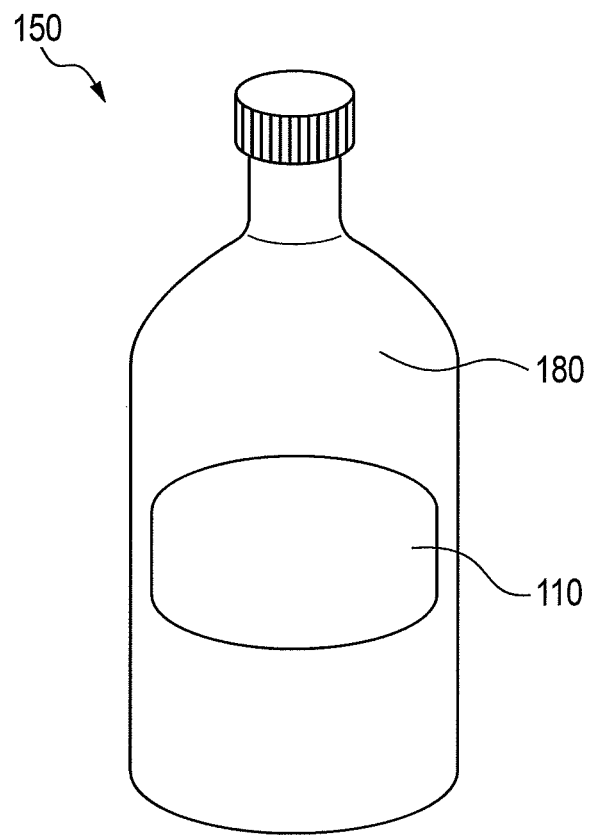
FIG. 3 is a schematic perspective view of a labeled container in accordance with another embodiment of the present subject matter.

FIG. 3 is a schematic perspective view of a labeled container 150 in accordance with the present subject matter. The labeled container 150 comprises a label construction 110 as described herein that is adhered to a container or bottle 180.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A label assembly comprising:
   at least one film layer exhibiting a moisture vapor transmission rate (MVTR) of from 0.50 to 2.00 g/(m² per day) and an oxygen transmission rate (OTR) of from 800 to 1,700 cc/(m² per day); and
   a layer of an adhesive disposed along the at least one film layer, the film having a MD modulus of from 50,000 to 300,000 psi.

2. The label assembly of claim 1 wherein the at least one film layer exhibits a MVTR of from 0.70 to 1.79 g/(m² per day).

3. The label assembly of claim 1 wherein the at least one film layer exhibits a OTR of from 913 to 1,520 cc/(m² per day).

4. The label assembly of claim 1 wherein the at least one film layer includes polypropylene, polyethylene, polyethylene terephthalate, polylactic acid, polystyrene, polyvinyl chloride, and combinations thereof.

5. The label assembly of claim 1 wherein the film has a MD modulus of from 80,000 to 225,000 psi.

6. The label assembly of claim 1 wherein the adhesive is an acrylic emulsion adhesive.

7. The label assembly of claim 1 wherein the adhesive has a tan delta value of 0.3-1.9 at 170-190° C.

8. The label assembly of claim 1 wherein the adhesive has a tan delta value from 0.5-3.2 at 140-170° C.

9. The label assembly of claim 1 wherein the thickness of the at least one film layer is from 1.0 to 10 mils.

10. The label assembly of claim 9 wherein the thickness of the at least one film layer is from 1.4 to 4 mils.

11. A labeled polymeric container comprising:
    a polymeric container; and
    a label assembly including (i) at least one film layer exhibiting a moisture vapor transmission rate (MVTR) of from 0.50 to 2.00 g/(m² per day) and an oxygen transmission rate (OTR) of from 800 to 1,700 cc/(m² per day); and (ii) a layer of an adhesive disposed between the at least one film layer and the container, the film having a MD modulus of from 50,000 to 300,000 psi.

12. The labeled polymeric container of claim 11 wherein the at least one film layer exhibits a MVTR of from 0.70 to 1.79 g/(m² per day).

13. The labeled polymeric container of claim 11 wherein the at least one film layer exhibits a OTR of from 913 to 1,520 cc/(m² per day).

14. The labeled polymeric container of claim 11 wherein the at least one film layer includes polypropylene, polyethylene, polyethylene terephthalate, polylactic acid, polystyrene, polyvinyl chloride, and combinations thereof.

15. The labeled polymeric container of claim 11 wherein the film has a MD modulus of from 80,000 to 225,000 psi.

16. The labeled polymeric container of claim 11 wherein the adhesive is an acrylic emulsion adhesive.

17. The labeled polymeric container of claim 11 wherein the container is a bottle configured for holding liquid.

18. The labeled polymeric container of claim 11 wherein the thickness of the at least one film layer is from 1.0 to 10 mils.

19. The labeled polymeric container of claim 18 wherein the thickness of the at least one film layer is from 1.4 to 4 mils.

20. The labeled polymeric container of claim 11 wherein the polymeric container includes a material selected from the group consisting of high density polyethylene (HDPE), polypropylene (PP), polystyrene (PS), ethylene vinyl alcohol (EVOH), polyethylene terephthalate (PET), polylactic acid (PLA), polyvinyl chloride (PVC), and combinations thereof.

21. The labeled polymeric container of claim 20 wherein the polymeric container includes HDPE.

22. The method of claim 21 wherein the polymeric container includes a material selected from the group consisting of high density polyethylene (HDPE), polypropylene (PP), polystyrene (PS), ethylene vinyl alcohol (EVOH), polyethylene terephthalate (PET), polylactic acid (PLA), polyvinyl chloride (PVC), and combinations thereof.

23. The method of claim 22 wherein the polymeric container includes HDPE.

24. A method of labeling polymeric containers, the method comprising:
    selecting a particular label assembly that includes at least one film layer exhibiting a moisture vapor transmission rate (MVTR) of from 0.50 to 2.00 g/(m² per day) and an oxygen transmission rate (OTR) of from 800 to 1,700 cc/(m² per day), and a layer of an adhesive disposed along the at least one film layer, the film having a MD modulus of from 50,000 to 300,000 psi;

applying the label assembly to the polymeric container.

25. The method of claim 24 wherein the at least one film layer exhibits a MVTR of from 0.70 to 1.79 g/(m² per day).

26. The method of claim 24 wherein the at least one film layer exhibits a OTR of from 913 to 1,520 cc/(m² per day).

27. The method of claim 24 wherein the at least one film layer includes polypropylene, polyethylene, polyethylene terephthalate, polylactic acid, polystyrene, polyvinyl chloride, and combinations thereof.

28. The method of claim 24 wherein the film has a MD modulus of from 80,000 to 225,000 psi.

29. The method of claim 24 wherein the adhesive is an acrylic emulsion adhesive.

30. The method of claim 24 wherein the container is a bottle configured for holding liquid.

31. The method of claim 24 wherein the applying of the label assembly to the polymeric container is performed such that the temperature of the container is from 75 to 125° F.

32. The method of claim 24 wherein the thickness of the at least one film layer is from 1.0 to 10 mils.

33. The method of claim 32 wherein the thickness of the at least one film layer is from 1.4 to 4 mils.

34. The method of claim 24 wherein the applying of the label assembly to the polymeric container is performed within 15 minutes of molding of the container.

35. The method of claim 34 wherein the applying is performed within 10 minutes.

36. The method of claim 35 wherein the applying is performed within 5 minutes.

\* \* \* \* \*